United States Patent [19]

Nagasubramanian et al.

[11] 4,144,158
[45] Mar. 13, 1979

[54] PROCESS FOR MANUFACTURE OF ANHYDROUS HYDROGEN FLUORIDE AND FINELY DIVIDED SILICA FROM FLUOSILICIC ACID

[75] Inventors: Krishnamurthy Nagasubramanian, Parsippany; Frederick P. Chlanda, Rockaway; Kang-Jen Liu, Bridgewater, all of N.J.

[73] Assignee: Allied Chemical Corporation, Morris Township, Morris Country, N.J.

[21] Appl. No.: 851,234

[22] Filed: Nov. 14, 1977

[51] Int. Cl.$^2$ .................. B01D 13/02; C01B 7/19; C01B 33/00
[52] U.S. Cl. .................. 204/180 P; 204/301; 423/337; 423/240; 423/484
[58] Field of Search .................. 204/180 P; 423/337, 423/240, 484

[56] References Cited
U.S. PATENT DOCUMENTS 3,787,304  1/1974  Chlanda et al. .................. 204/180 P
3,907,653  9/1975  Horn .................. 204/180 P X

FOREIGN PATENT DOCUMENTS 174610  12/1965  U.S.S.R. .................. 204/180 P

*Primary Examiner*—Arthur C. Prescott
*Attorney, Agent, or Firm*—Robert J. North; Robert A. Harman

[57] ABSTRACT

An improved process is described for converting aqueous fluosilicic acid waste product into anhydrous hydrogen fluoride and finely divided silica in which aqueous fluosilicic acid is pyrolyzed to produce silica and a dilute aqueous solution of hydrogen fluoride and fluosilic acid. The resulting dilute solution is subjected to electrodialysis, thereby obtaining a hydrogen fluoride concentration greater than that which characterizes the boiling point ridge which divides the phase diagram of the system hydrogen fluoride/fluosilicic acid/water, i.e. $HF/H_2SiF_6/H_2O$, into two regions. Anhydrous hydrogen fluoride is recovered from the resulting composition by distillation.

10 Claims, 4 Drawing Figures

PROCESS FOR MANUFACTURE OF ANHYDROUS HYDROGEN FLUORIDE AND FINELY DIVIDED SILICA FROM FLUOSILICIC ACID

BACKGROUND OF THE INVENTION

1. Field of the Invention

This invention relates to a process for producing anhydrous hydrogen fluoride and finely divided silica from waste fluosilicic acid solutions.

2. Brief Description of the Prior Art

In the industrial manufacture of phosphoric acid, phosphate rock is treated with sulfuric acid, thereby resulting in a byproduct of aqueous fluosilicic acid which is produced in large quantities and is normally discarded. Because of the attendant pollution problems associated with discarding this waste product and the potential value of the waste product as a source of silica and hydrogen fluoride, an economical and efficient process is highly desired for recovery of these important and useful industrial materials from by-product fluosilicic acid.

Finely divided silica has been historically used as a white pigment in paints for decorating and protecting the surfaces of a wide variety of articles and products such as automobiles, household interiors and exteriors.

Anhydrous hydrogen fluoride is widely used in applications such as polishing, etching and frosting of glass; for pickling copper, brass, stainless and other alloy steels; electro-polishing of metals; manufacture of fluorocarbons; manufacture of cryolite; cleaning stone and brick; purification of filter paper and graphite, and dissolving ores and cleaning castings.

U.S. Pat. No. 3,787,304 (Chlanda, Liu, 1974) describes a process wherein aqueous fluosilicic acid is converted to a fluoride salt solution and silica by treatment with hydroxide base solution. The silica is filtered off and the fluoride salt solution is then converted to an aqueous solution of hydrogen fluoride by an electrodialytic water-splitting process. The base solution is recycled, and the aqueous acid solution is then treated by membrane electrodialysis to produce a concentrated aqueous solution of hydrogen fluoride, from which anhydrous hydrogen fluoride is subsequently obtained by distillation. However, no suggestion is made regarding the utility of the process in treating ternary liquid systems, such as hydrogen fluoride/fluosilicic acid/water.

U.S. Pat. No. 3,969,485 (1976) describes a process for converting fluosilicic acid to silica and hydrogen fluoride by treating fluosilicic acid with sulfuric acid to produce hydrogen fluoride and silicon tetrafluoride which is treated with water in a vapor-phase process to form silica. However, the hydrogen fluoride is recovered in the process by treating aqueous solutions of hydrogen fluoride with sulfuric acid to eliminate water, followed by distillation.

A process is described in U.S. Pat. No. 4,036,938, (1977) in which an aqueous solution of fluosilicic acid is pyrolyzed to form silica and a dilute aqueous solution of hydrogen fluoride. The aqueous solution of hydrogen fluoride is subsequently treated with sulfuric acid to remove water and the hydrogen fluoride is isolated in the process by distillation.

A related process is described in U.S. Pat. No. 4,008,130 (1977) for producing the ternary azeotropic system of $HF/H_2SiF_6/H_2O$ in various processes, to avoid the undesirable formation of $SiO_2$ during use. However, the teaching of the reference is not directed to the recovery of HF from the azeotropic system.

A process is also described in Russian Patent USSR No. 174,610 (1965) involving an electrodialysis method of concentrating substances, including fluosilicic acid, wherein sulfuric acid is utilized in the anolyte.

A process for recovery of hydrofluoric acid is described in U.S. At. Energy Comm. ORNL-208, 14 pp. (1956) in which a by-product aqueous solution of hydrofluoric acid from the hydrofluorination of uranyl dioxide is subjected to electrodialysis followed by distillation to recover hydrofluoric acid. However, the authors believe that the process is not economical for commercial use.

What is needed and what the prior art does not provide is a process for manufacturing silica and anhydrous hydrogen fluoride from waste aqueous fluosilicic acid solution without the necessity of using large amounts of hydroxide base, sulfuric acid or the process of electrodialytic water-splitting, in recovering anhydrous hydrogen fluoride from the ternary liquid system of hydrogen fluoride/fluosilicic acid/water.

SUMMARY OF THE INVENTION

In accordance with this invention there is provided an improved process for converting aqueous fluosilicic acid to anhydrous hydrogen fluoride and finely divided silica including pyrolyzing aqueous fluosilicic acid to form finely divided silica and a dilute aqueous solution of hydrogen fluoride and fluosilicic acid and thereafter adding sulfuric acid and distilling out hydrogen fluoride, in which the improvement comprises subjecting the dilute solution to electrodialysis, thereby obtaining a hydrogen fluoride concentration greater than that which characterizes the boiling point ridge which divides the phase diagram of the system hydrogen fluoride/fluosilicic acid/water into two regions, and recovering anhydrous hydrogen fluoride from the resulting composition by distillation.

Also provided is an improvement in accordance with the above process which further comprises (a) distilling water from the dilute aqueous solution before electrodialysis and (b) drawing off a heavier fluosilicic acid enriched bottom portion therefrom.

Further provided is a process for recovering anhydrous hydrogen fluoride from liquid $HF/H_2SiF_6/H_2O$ systems which comprises the steps of:

(a) subjecting said liquid system to electrodialysis, thereby obtaining a hydrogen fluoride concentration greater than that which characterizes the boiling point ridge which divides the phase diagram of the system $HF/H_2SiF_6/H_2O$ into two regions; and (b) recovering anhydrous hydrogen fluoride from the resulting composition by distillation.

DETAILED DESCRIPTION OF THE INVENTION AND PREFERRED EMBODIMENTS

We have surprisingly found that after pyrolysis of the aqueous fluosilicic acid in the prior art process, in which finely divided silica is subsequently separated out, the resulting dilute ternary liquid system of hydrogen fluoride/fluosilicic acid/water, usually containing up to about 37 weight percent HF and up to about 5 weight percent $H_2SiF_6$, can be subjected to electrodialysis, wherein the dilute solution can be concentrated to a hydrogen fluoride concentration greater than that which characterizes the boiling point ridge separating the diagram of the system $HF/H_2SiF_6/H_2O$ into two regions, and recovering AHF therefrom by distillation. By the term "electrodialysis", as used herein, is meant a form of dialysis in which an electric current aids the separation of substances that ionize in solution.

Figure 2:
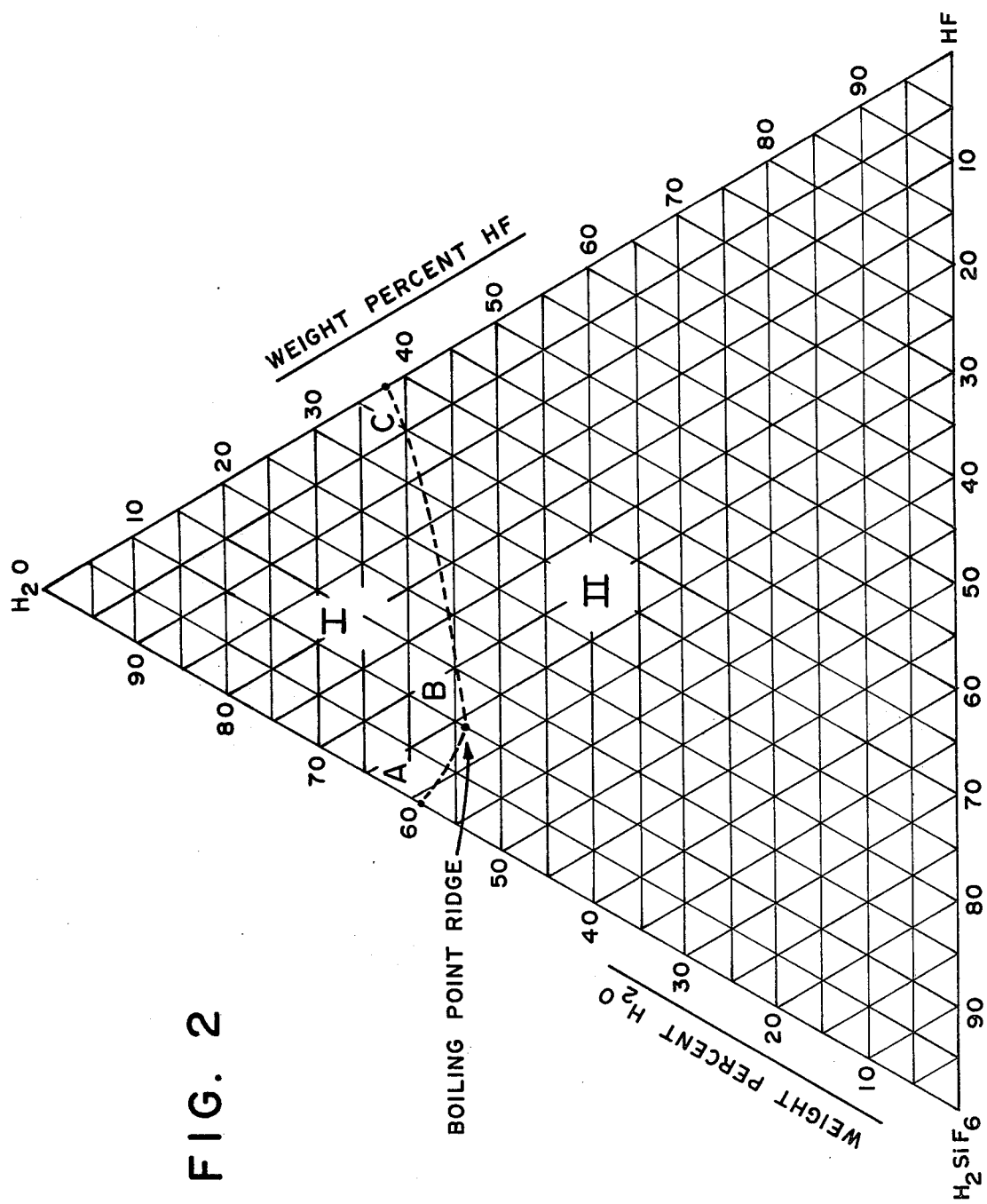
FIG. 2 is a diagram of the ternary liquid system of $HF/H_2SiF_6/H_2O$ illustrating the "boiling point ridge" separating regions I and II, which represents the boundary over which the liquid composition in one region cannot be distilled at normal pressure to yield a condensate having a composition lying in the other region.

FIG. 2 illustrates the ternary phase diagram of the liquid system $HF/H_2SiF_6/H_2O$, described in the article by Munter et al., in Industrial and Engineering Chemistry, Vol. 39, No. 3 pages 427–431 (March, 1947). As illustrated in the figure, regions I and II represent the regions from which a liquid cannot be distilled to yield a liquid composition lying in another region. The dotted line represents the boiling point ridge between these two regions and point A represents the binary azeotrope of $H_2SiF_6/H_2O$, of about 41/59 weight percent respectively, boiling point about 111.5° C. at one atmosphere; point B represents the ternary azeotrope of $HF/H_2SiF_6/H_2O$, of about 10/36/54 weight percent respectively, boiling point about 116.1° C. at one atmosphere; and point C represents the binary azeotrope of $HF/H_2O$, of about 38/62 weight percent respectively, boiling point of about 112° C. at one atmosphere.

After pyrolysis of the aqueous fluosilicic acid, the resulting dilute solution of $HF/H_2SiF_6/H_2O$ usually lies in region I and cannot be directly distilled to yield anhydrous hydrogen fluoride. Referring to FIG. 2, it will be seen that the HF concentration in the ternary liquid system must be increased to a value in region II, to enable anhydrous HF to be obtained therefrom by distillation.

Figure 3:
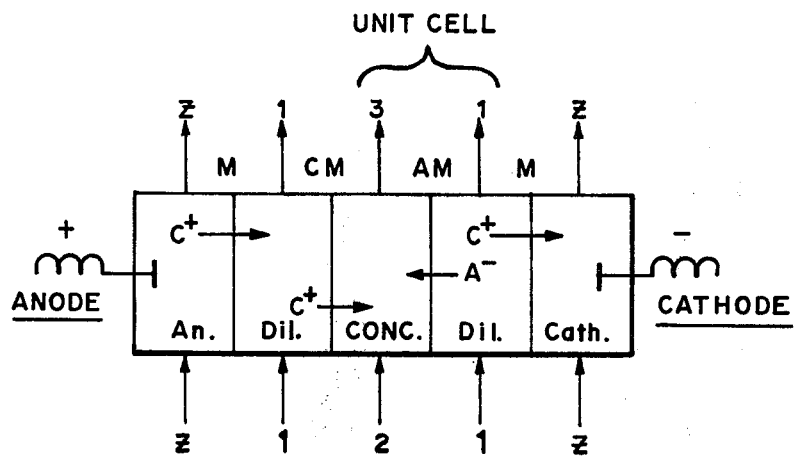
FIG. 3 is a schematic diagram of the five compartment electrodialysis unit used in the Preliminary Test and Example 1 described in the specification. The symbols An, Dil$_1$, Conc, Dil$_2$, Cath are used to designate Anolyte, Dilute$_1$, Concentrate, Dilute$_2$, Catholyte compartments, respectively, which contain the designated liquid compositions. The symbols AM and CM represent anion exchange and cation exchange membranes, respectively, and are the membranes separating the compartments and direct the ion migration under an appled current. The symbol M represents a conductive membrane which can be a cation- or anion-permeable membrane. Usually, cation-permeable membranes are utilized in bounding the cathode and anode compartments, respectively. The symbols $C^+$ and $A^-$ represent charged cation and anion species, respectively. The symbol Z represents liquid used as both anolyte and catholyte. Number 1 represents a dilute solution of $HF/H_2SiF_6/H_2O$ which is fed to the Dilute$_1$ and Dilute$_2$ compartments, which is recycled to combine with more dilute solution following electrodialysis. Number 2 represents either a dilute solution of $HF/H_2SiF_6/H_2O$, same as 1, or a more concentrated solution. Number 3 represents a concentrated solution of $HF/H_2SiF_6/H_2O$, containing an HF concentration greater than that of stream 2. The unit cell of the assembly comprising a dilute and a concentrate compartment, separated by an anion-permeable membrane, and bounded by cation-permeable membranes, as shown.

A general method for conducting this operation on a laboratory scale is to use an electrodialysis assembly as shown in FIG. 3, comprising five compartments, separated by membranes, of anolyte (anode); cation exchange membrane; dilute$_1$; cation exchange membrane; concentrate; anion exchange membrane; dilute$_2$; cation exchange membrane; catholyte (cathode). The anolyte compartment contains an anode, usually platinum, immersed in an anolyte such as a solution of 5 weight percent sulfuric acid. Dilute$_1$, dilute$_2$ and concentrate compartments all initially contain the dilute aqueous solution of $HF/H_2SiF_6$ from the pyrolysis. The catholyte compartment contains a cathode, usually platinum, immersed in a catholyte such as a solution of 5 weight percent sulfuric acid. Usually, the anolyte and catholyte are the same solution. The cathode and anode are connected to a suitable direct current source. The cation exchange membranes can be of any conventional types available and among those which were found useful in the process are the C-100 and C-322 membranes manufactured by AMF Inc. The anion exchange membrane can be of any conventional type available such as the ASV anion membrane manufactured by Asahi Glass Company.

Modification can of course be made by one skilled in the art with respect to the number of chambers and types of membranes employed without departing from the scope and spirit of the invention.

When direct current is applied to the cell assembly, fluoride anions in the dilute$_2$ compartment will migrate through the anion permeable membrane into the concentrate compartment; hydrogen ions will migrate through the cation permeable membrane from the anolyte compartment to the dilute$_1$ compartment, from the dilute$_1$ compartment into the concentrate compartment, and from the dilute$_2$ compartment into the catholyte compartment. The current in the assembly is transported by migrating cations and anions. The overall result is that the concentrate compartment will contain a higher concentration of HF than the original dilute concentration, greater than 38 weight percent, and the dilute$_2$ compartment will be significantly depleted in HF concentration. Very little migration of H$_2$SiF$_6$ will occur since HF appears to be preferentially transported.

The concentrated solution is then subjected to distillation to recover anhydrous hydrogen fluoride and the dilute solution is recycled and combined with more dilute solution sent to the electrodialysis unit to initiate the process cycle again.

Figure 1:
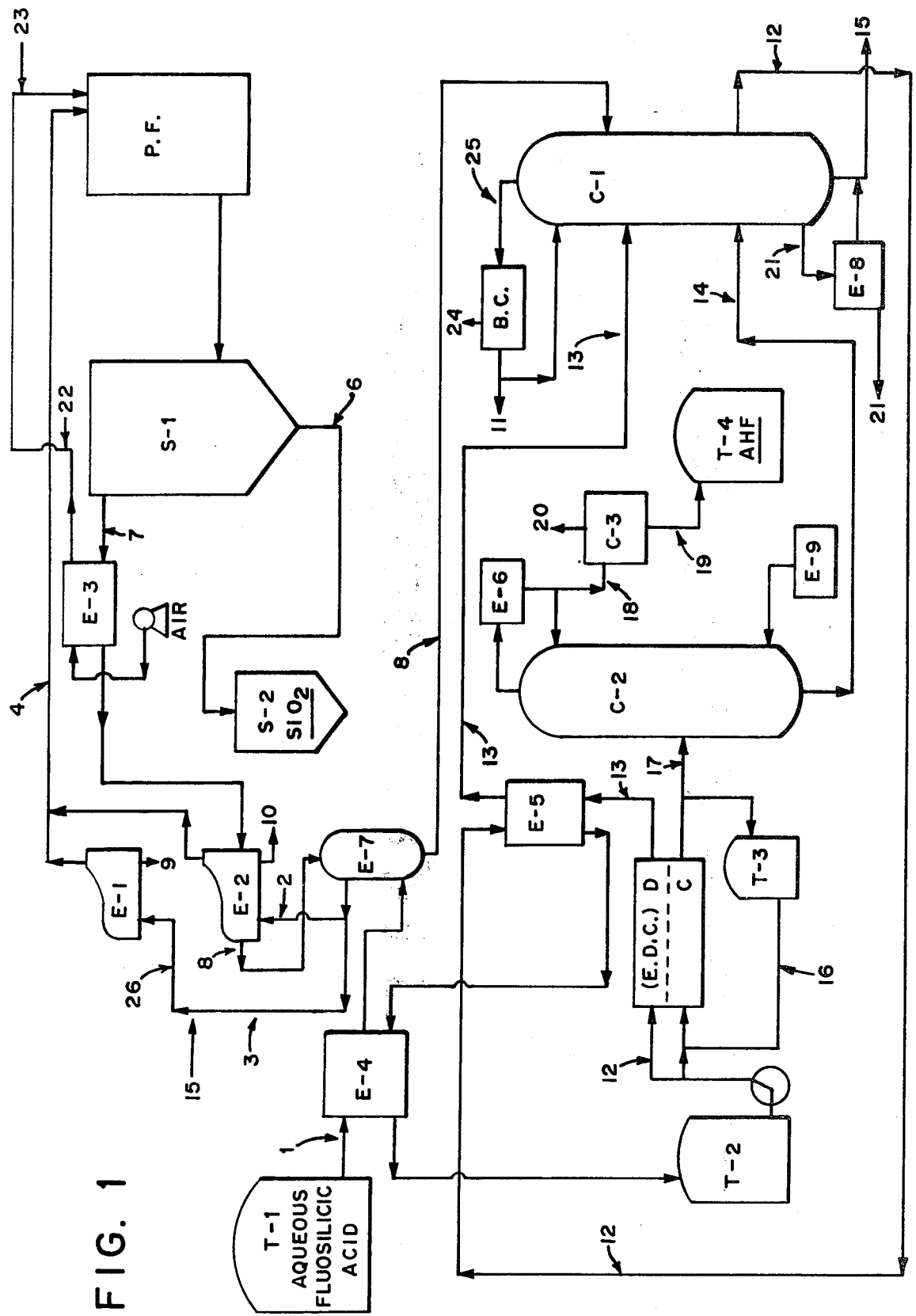
FIG. 1 is a flow diagram illustrative of the process in which aqueous fluosilicic acid is converted by pyrolysis to finely divided silica and a dilute aqueous solution of fluosilicic acid and hydrogen fluoride, and hydrogen fluoride is recovered therefrom by the technique of electrodialysis followed by distillation.
Figure 4:
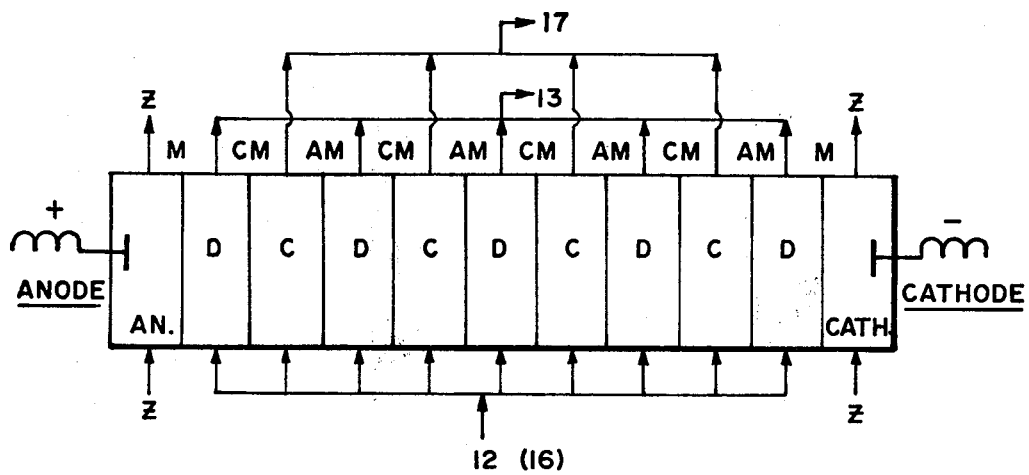
FIG. 4 is a schematic diagram of a typical electrodialysis unit, designated EDC, utilized in the process shown in FIG. 1. The symbols D and C represent the dilute and concentrate compartments, respectively, into which the dilute $HF/H_2SiF_6/H_2O$ stream 12, and optionally stream 16, are fed. The effluent streams from compartments D, after electrodialysis, are collected as stream 13 for recycle back to distilling column C-1, in FIG. 1. The concentrated effluent streams from compartments C, after electrodialysis, are collected as stream 17 and fed to distillation column C-2, as shown in FIG. 1 with the remainder being recycled back as stream 16 and combined with a portion of stream 12. The symbols AM, CM, Z, An, Cath are the same as described above in FIG. 3. For convenience, the unit shown in FIG. 4 contains only 4 basic C:D cell units. However, in practice the unit may contain up to several hundred C:D units, the number which may vary depending upon the capacity of the system.

FIG. 4 illustrates an electrodialysis stack assembly used in the process as shown in FIG. 1. Optionally, a series of stack assemblies could be used to provide greater capacity and higher HF concentrations. The assembly operates on the same principle as described for the laboratory unit described above. However, in a large scale process up to several hundred of the C:D units, i.e. concentrate/dilute compartments are used where the larger the number, the greater the capacity of the unit. Stream 16 as shown in FIG. 1, can be optionally mixed with stream 12, or fed undiluted directly to the C compartments of the electrodialysis unit.

As is seen from FIG. 3 and FIG. 4, the electrodialysis assembly is designed so that fluoride ion and hydrogen ion are allowed to migrate into the C compartment under the influence of an applied electric potential, and both ions are constrained from migrating out of the C compartment by virtue of the ion-selective membranes and the applied potential, thus resulting in a steadily increasing concentration of hydrogen fluoride in the C compartment. The contents of each C compartment in the assembly are drawn off by conventional means, such as an overflow valve or piping system, and are subsequently combined to form stream 17 when the hydrogen fluoride concentration is at least about 38 weight percent of the aqueous solution, greater than the boiling point ridge and in region II, and preferably about 40 to 60 weight percent hydrogen fluoride. A portion of the stream is then fed to distilling column C-2 for recovery of anhydrous hydrogen fluoride and the remainder of the stream is fed to tank T-3 for recirculation to the electrodialysis assembly. This recycle is generally required to provide the needed flow velocity in the electrodialysis cell.

The efficiency of the electrodialysis step is determined by the number of moles of product transported per Faraday of current, wherein a Faraday is defined as being 96,500 coulombs and is equal to the amount of electrical current required to deposit one gram equivalent weight of a substance at an electrode from solution. In the absence of other factors, the theoretical efficiency for the electrodialysis should be one gram equivalent passed per Faraday. In the case of fluosilicic acid, the number of equivalents passed per Faraday upon electrodialysis is about 0.01 to 0.05, indicating a relatively low tendency to migrate under the influence of the applied current. In the case of hydrogen fluoride, the ratio of equivalents passed per Faraday is about 1.60 to 2.25, indicating that the migration of hydrogen fluoride in solution is a complex process probably involving dimers, trimers or complex anions since the value is greater than one, a factor which makes the process very attractive.

The efficiency of the electrodialysis step is enhanced by starting with at least about 0.1 weight percent of hydrogen fluoride in the aqueous solution of C compartments of the unit cell and usually contains a concentration of about 10 to 45 weight percent of hydrogen fluoride.

The prior art process steps of pyrolyzing aqueous fluosilicic acid and separating the silica formed from the dilute aqueous solution of HF/H$_2$SiF$_6$, including process variables, such as pyrolysis temperatures employed, specification of the apparatus used to separate the finely divided silica formed, are well-known in the prior art, as described, for example, in the above-identified patent of Reed, supra.

A description of the general overall process incorporating a concentration step involving electrodialysis can be made by reference to FIG. 1.

Aqueous fluosilicic acid, of about 15 to 30 weight percent H$_2$SiF$_6$, is fed from storage tank T-1 as stream 1 to evaporators E-4 and E-7 which successively heat the material prior to pyrolysis. After exiting from E-7, one half of the stream, as stream 2, is fed into evaporator E-2 and the other half, as stream 3, is combined with recycle stream 15 and fed to evaporator E-1 which further raises the temperature of the stream. Stream 9 containing small amounts of phosphoric acid is drawn off from evaporator E-1. The exiting stream is subsequently combined with stream 2, having passed through evaporator E-2, to form stream 4. Stream 10 containing small amounts of phosphoric acid is drawn off from evaporator E-2. Stream 4 is fed to the pyrolysis furnace, P.F., where pyrolysis of aqueous fluosilicic acid to silica and gaseous HF is accomplished at a temperature of about 900° to 1000° C. The exit stream 5, from P.F., is passed into S-1, a silica separator in which the coagulated silica particles are fed out of the bottom as stream 6 to S-2, a silica storage tank. Exit stream 7 from S-1, consisting of a dilute aqueous solution of about 12 weight percent HF and about 1 weight percent H$_2$SiF$_6$ is passed through evaporator E-3 for cooling and then to evaporator E-2 where it exits as stream 8 and subsequently passes through evaporator E-7 and is then sent to distillation column C-1. About 10 weight percent of water in the column contents is distilled off as stream 25 into condenser BC and by-product gases are fed out of BC as stream 24 and water condensate as stream 11. A heavy fluosilicic acid enriched bottom layer, containing about 25 weight percent H$_2$SiF$_6$, is drawn off from C-1 as stream 15 and recycled to combine with stream 3. The dilute aqueous solution of HF/H$_2$SiF$_6$, as stream 12, containing about 30-37 weight percent HF and about 1 weight percent H$_2$SiF$_6$, is fed through evaporators E-5 and E-4 to cool and then to holding tank T-2 from where it is fed into the electrodialysis unit, EDC, containing a plurality of unit cells as illustrated in FIG. 4. The combined concentrate compartments is designated as compartment C, and the combined dilute compartments is designated as compartment D. After electrodialysis, the concentrated stream from C, containing about 38 to 60 weight percent of hydrogen fluoride, is passed as stream 17 to distilling column C-2 where HF is distilled off and condenses in evaporator E-6 and, as stream 18, passes through purification tower C-3. Small amounts of water and SiF$_4$ are drawn off as stream 20. Purified anhydrous HF as stream 19 is fed into storage tank T-4. Optionally, a portion of stream 17 is drawn off and is recycled to tank T-3 and then back into the EDC unit as stream 16 for further concentration. The dilute stream from D, in the EDC unit, containing about 30 weight percent HF, is fed as stream 13 through evaporator E-5 and recycled back to the distilling column C-1. The remainder of the concentrated solution from the distilling column C-2, after HF distillation, containing about 25-30 weight percent HF and 1-5 weight percent $H_2SiF_6$, is fed as stream 14 back to distilling column C-1 to combine with streams 8 and 13. Stream 21 is drawn off the bottom of C-1 containing small amounts of phosphoric acid.

A further embodiment of the improved process comprises (a) distilling water from the aqueous solution before electrodialysis and (b) drawing off a heavier fluosilicic enriched bottom portion therefrom.

In general, the dilute aqueous solution, exemplified by stream 8 in FIG. 1, usually contains about 80-90 percent by weight of water if economic conditions warrant. Thus, the water content can be reduced by at 10 to 20 weight percent by distillation prior to electrodialysis.

Following the distillation of the water, in the normal separating mode of the process, streams 13 and 14 are recycled back to distilling column C-1 as in FIG. 1 and a composition gradient forms in the column whereby a heavier fluosilicic acid enriched bottom is formed, containing about 10-20 weight percent HF, about 25-35 weight percent $H_2SiF_6$ and the remainder being water. It is preferred to draw this heavier layer off before passing the column contents of C-1 to the electrodialysis unit since large amounts of $H_2SiF_6$ will significantly decrease the amount of HF in the concentrate due to the concurrent migration of $H_2SiF_6$ from the dilute solution to the concentrated solution. It is preferred to withdraw the fluosilicic acid enriched bottom portion when the bottom portion contains about 25 weight percent fluosilicic acid.

Generally, by the use of the water distillation step and the step of drawing off the heavier fluosilicic acid enriched bottom portion, the dilute aqueous solution is usually concentrated to a hydrogen fluoride concentration of about 26 to 38 weight percent of the solution prior to electrodialysis.

Various modifications can be made in the process by one skilled in the art without departing from the scope and spirit of the invention.

For example, the distilling column C-1 as shown in FIG. 1, can be eliminated and the aqueous fluosilicic acid sent directly to the electrodialysis unit. However, the treatment step of concentrating the dilute aqueous solution to about 35-37 weight percent prior to electrodialysis significantly improves the economic attractiveness of the system.

The following table illustrates relative compositions of each of the numbered streams of the general process shown in FIG. 1, and the relative operating temperatures of each stream as might be normally used in such a process. The numbers are expressed in units of pounds per hour of the component in the membered stream, but can also represent grams or tons per unit time.

An overall yield of anhydrous hydrogen fluoride based on starting fluosilicic acid is about 95 to 99 percent of theory, and by the term "anhydrous" is meant a water concentration in the HF of about 0.001 to 1 percent by weight.

Total hours of operation required for providing 40,000 tons of AHF is about 7792 hours during which about 20,000 tons of finely divided silica is also produced.

The process step of recovering anhydrous hydrogen fluoride from liquid $HF/H_2SiF_6/H_2O$ systems by electrodialysis is also applicable to other processes which involve the ternary system. Thus a further subject of this invention is a process for recovering anhydrous hydrogen fluoride from liquid $HF/H_2SiF_6/H_2O$ systems which comprises the steps of (a) subjecting said liquid system to electrodialysis, thereby obtaining a hydrogen fluoride concentration greater than that which characterizes the boiling point ridge which divides the phase diagram of the system $HF/H_2SiF_6/H_2O$ into two regions; and (b) recovering anhydrous hydrogen fluoride from the resulting composition by distillation.

A further modification of this process, and the general process for producing anhydrous hydrogen fluoride and finely divided silica from fluosilicic acid, involves subjecting the liquid $HF/H_2SiF_6/H_2O$ system to electrodialysis at least twice, as in the above step (a). This can be performed where a higher overall concentration of HF is desired prior to distillation, by passing the liquid system through a series of electrodialysis units or by a recycle of the liquid system through the same assembly. Variations and modifications of this operative step will be obvious to one skilled in the art from this disclosure.

TABLE I

| Stream Compositions in Pounds/Hour and Operating Temperatures | | | | | | |
|---|---|---|---|---|---|---|
| Component | 1 | 2 | 3 | 4 | 5 | 6 |
| $H_2SiF_6$ | 12582 | 10397 | 2185 | | | |
| $H_3PO_4$ | 648 | 535.5 | 112.5 | | | |
| $P_2O_5$ | | | | 1.45 | 1.45 | |
| $H_2O$ | 70878 | 58569.2 | 12308.8 | 70933.65 | 78543.7 | |
| HF | | | | 3867.9 | 10889.98 | |
| $SiF_4$ | | | | 9315.0 | 186.3 | |
| $SiO_2$ | | | | | 5266.6 | 5135 |
| $N_2$ | | | | | 73706.4 | |
| $O_2$ | | | | | 362.22 | |
| $CO_2$ | | | | | 13272.9 | |
| Total | 84108 | 69501.1 | 14606.3 | 84118.0 | 182229.5 | 5135 |
| TEMP °F. | 80 | 265 | 265 | 280 | 1680 | 1620 |
| Component | 7 | 8 | 9 | 10 | 11 | 12 | 13 |
| $H_2SiF_6$ | | | 41.31 | 196.69 | | 1077.25 | |
| $H_3PO_4$ | | | 112.2 | 533.8 | | | |
| $P_2O_5$ | 1.45 | 1.45 | | | | | |
| $H_2O$ | 78543.7 | 78622.6 | 165.2 | 785.8 | 2235499 | 94098.11 | 71537.76 |
| HF | 10989.98 | 10714.51 | 1.0 | | | 55896.64 | 30659.0 |
| $SiF_4$ | 186.3 | 414.41 | | | | | |
| $SiO_2$ | 131.6 | | | | | | |
| $N_2$ | 73706.4 | 73706.4 | | | | | |
| $O_2$ | 362.22 | 362.22 | | | | | |
| $CO_2$ | 13272.9 | 13272.9 | | | | | |
| Total | 177094.5 | 177094.5 | 319.71 | 1516.29 | 2235499 | 151072.0 | 102196.8 |
| TEMP °F | 1610 | 274 | 285 | 285 | 180 | 270 | 255 |
| Component | 14 | 15 | 16 | 17 | 18 | 19 |
| $H_2SiF_6$ | 1066.45 | 553.8 | 5523.99 | 1077.25 | | |

TABLE I-continued

| Stream Compositions in Pounds/Hour and Operating Temperatures | | | | | | |
|---|---|---|---|---|---|---|
| H$_3$PO$_4$ | | | | | | |
| CH$_4$ | | | | | | |
| H$_2$O | 23260.12 | 1006.1 | 119788.5 | 23360.35 | 0.23 | |
| HF | 14173.17 | 286.1 | 125312.5 | 24437.6 | 10267.43 | 10267.43 |
| SiF$_4$ | | | | | 7.8 | |
| N$_2$ | | | | | | |
| O$_2$ | | | | | | |
| CO$_2$ | | | | | | |
| Total | 38599.74 | 1846.0 | 250625.0 | 48875.20 | 10275.43 | 10267.48 |
| TEMP °F. | 230 | 274 | 104 | 120 | 68 | 77 |

| Component | 20 | 21 | 22 | 23 | 24 | 25 | 26 |
|---|---|---|---|---|---|---|---|
| H$_2$SiF$_6$ | | 9.2 | | | | | 2738.8 |
| H$_3$PO$_4$ | | 2.0 | | | | | 112.5 |
| CH$_4$ | | | | 4786.53 | | | |
| H$_2$O | 0.23 | 16.8 | | | | 2157900. | 13314.9 |
| HF | | 4.6 | | | | | 286.1 |
| SiF$_4$ | 7.8 | | | | | | |
| N$_2$ | | | 73428.0 | 272.4 | 73706.46 | | |
| O$_2$ | | | 19508.4 | | 362.22 | | |
| CO$_2$ | | | | 109.7 | 13272.9 | | |
| Total | 8.03 | 32.60 | 92936.4 | 5174.63 | 87341.58 | 2157900. | 16452.3 |
| TEMP °F. | 77 | 274 | 500 | 77 | 180 | 104 | 265 |

The following examples are illustrative of the best mode contemplated by us of carrying out our invention, but are not to be construed as being limitations on the scope or the spirit of the instant invention.

Preliminary Test

An electrodialysis cell, as illustrated in FIG. 3, was used to determine the behavior of aqueous solutions of HF and H$_2$SiF$_6$ during the process of electrodialytic concentration. Polyfluorocarbon cylinders (equipped with solution inlets and outlets) were placed between the membranes which were of about 11 cm$^2$ exposed surface area. The membrane and cell arrangement that was used is: platinum anode, C-100 (AMF Incorporated) cation exchange membrane; C-322 (AMF Inc.) cation exchange membrane; ASV (Asahi Glass Co.) anion exchange membrane; C-100 cation exchange membrane; and platinum cathode, forming five compartments which were (from the anode side): anolyte, dilute$_1$, concentrate, dilute$_2$, catholyte. The anolyte and catholyte were both fed from a reservoir of 5 weight percent sulfuric acid. The dilute compartments were fed from a separate reservoir containing a dilute aqueous solution of 2.0 weight percent H$_2$SiF$_6$ and 11.8 weight percent HF. The concentrate compartment contained a solution of 10.0 weight percent HF (containing no H$_2$SiF$_6$). The dilute$_1$ solution does not undergo anion exchange with the concentrate solution but is employed as a proton source. The electrodialysis of HF occurs between the dilute$_2$ solution and the concentrate solution.

After passage of a direct current of two amperes for 1,000 seconds, the dilute$_2$ solution contained 11.3% HF and 2% H$_2$SiF$_6$, representing a decrease of 0.5 weight percent HF. The effluent concentrate solution contained 0.33% H$_2$SiF$_6$ and 11.9% HF. Thus, 2.22 moles of HF and 0.04 mole of H$_2$SiF$_6$ from the dilute$_2$ compartment were transported per Faraday of current passed, resulting in a 19 percent increase in the concentration of HF in the concentrate compartment. It was found that HF was transported from the dilute$_2$ compartment to the concentrate compartment in preference to H$_2$SiF$_6$.

EXAMPLE 1

Utilizing the apparatus of the Preliminary Test, the dilute$_1$, dilute$_2$ and concentrate chambers were charged with an aqueous solution of 31.6 weight percent HF and 3.0 weight percent H$_2$SiF$_6$. A direct current of three amperes was passed for a total of 12,000 seconds and samples of the concentrate compartment were collected at 1000 second intervals. After 9000 seconds, the concentration of the concentrate solution remained nearly constant at 46 weight percent HF and 1.9 weight percent H$_2$SiF$_6$. The results indicate that 1.60 mols of HF and 0.01 mols of H$_2$SiF$_6$ were transported per Faraday passed. Here, the dilute solution in the concentrate chamber was concentrated in HF at the expense of the dilute$_2$ solution in the dilute$_2$ chamber, the technique that is basically used in the invention process. The dilute solution approximates the composition of stream 12 in FIG. 1, being fed to the electrodialysis unit and the concentrate solution approximates the composition of stream 17 in FIG. 1. Thus, by subjecting the dilute aqueous solution to electrodialysis, the concentration of HF can be increased from about 31 weight percent to above 38 weight percent, above the weight percent of HF which characterizes the boiling point ridge which divides the phase diagram of the system HF/H$_2$SiF$_6$/H$_2$O into two regions.

We claim:

1. In a process for converting aqueous fluosilicic acid to anhydrous hydrogen fluoride and finely divided silica comprising pyrolyzing aqueous fluosilicic acid to form finely divided silica and a dilute aqueous solution of hydrogen fluoride and fluosilicic acid and thereafter distilling out hydrogen fluoride, the improvement which comprises subjecting the dilute solution to electrodialysis, thereby obtaining a hydrogen fluoride concentration greater than that which characterizes the boiling point ridge which divides the phase diagram of the system hydrogen fluoride/fluosilicic acid/water into two regions, and recovering anhydrous hydrogen fluoride from the resulting composition by distillation.

2. The improvement in accordance with claim 1 wherein the dilute solution is subjected to electrodialysis by:

(a) introducing the dilute solution into a dilute compartment, D, of a unit cell in an electrodialysis assembly sequentially comprising: anode compartment; at least one unit cell; cathode compartment, said anode compartment containing an anode immersed in an anolyte and said cathode compartment containing a cathode immersed in a catholyte, the unit cell comprising a concentrate compartment, C, and the dilute compartment, D, said compartments C and D being separated by an anion-permeable membrane and being bounded by cation-permeable membranes, and C containing an aqueous solution comprising at least about 0.1 weight percent hydrogen fluoride, in which electrodialysis assembly, under the influence of an applied electric potential, fluoride ion is caused to migrate through the anion-permeable membrane from D into C in the direction of the anode and is constrained from migrating out of C by the bounding cation-permeable membrane, and hydrogen ion is caused to migrate through the cation-permeable membrane from the anode compartment, or the D compartment of an adjacent unit cell, into C in the direction of the cathode and is constrained from migrating out of C by the anion-permeable membrane of the unit cell, wherein the current in the assembly is transported by migrating cations and anions, and drawing off the solution in C when hydrogen fluoride is about 38 weight percent of the solution.

3. The improvement in accordance with claim 1 wherein the hydrogen fluoride concentration is at least about 38 percent by weight of the solution after electrodialysis.

4. The improvement in accordance with claim 3 wherein the hydrogen fluoride concentration is about 38 to 60 percent by weight of the solution after electrodialysis.

5. The improvement in accordance with claim 1 which further comprises (a) distilling water from the dilute aqueous solution before electrodialysis and (b) drawing off a heavier fluosilicic acid enriched bottom portion therefrom.

6. The improvement in accordance with claim 5 wherein water is distilled in step (a) to reduce the water concentration by at least about 10 weight percent of the solution.

7. The improvement in accordance with claim 5 wherein the fluosilicic acid enriched bottom portion drawn off in step (b) contains about 25 weight percent of fluosilicic acid.

8. The improvement in accordance with claim 5 wherein the dilute aqueous solution is concentrated to a hydrogen fluoride concentration of about 26 to 38 weight percent of the solution after process steps (a) and (b) are performed.

9. A process for recovering anhydrous hydrogen fluoride from liquid $HF/H_2SiF_6/H_2O$ systems which comprises the steps of:
(a) subjecting said liquid system to electrodialysis, thereby obtaining a hydrogen fluoride concentration greater than that which characterizes the boiling point ridge which divides the phase diagram of the system $HF/H_2SiF_6/H_2O$ into two regions; and
(b) recovering anhydrous hydrogen fluoride from the resulting composition by distillation.

10. The process of claim 9 wherein the liquid system is subjected to electrodialysis in step (a) at least twice.

* * * * *